United States Patent [19]

Jollois

[11] 4,135,106

[45] Jan. 16, 1979

[54] EDDY-CURRENT RETARDERS WHOSE STATOR COMPRISES A RING OF ELECTRO-MAGNETS

[75] Inventor: Jean-Marie Jollois, Courbevoie, France

[73] Assignee: Labavia S.G.E., Paris, France

[21] Appl. No.: 818,858

[22] Filed: Jul. 25, 1977

[30] Foreign Application Priority Data

Jul. 30, 1976 [FR] France ............................... 76 23474

[51] Int. Cl.² ..................... H02K 49/02; H01F 15/10
[52] U.S. Cl. ..................................... 310/105; 310/42; 310/43; 336/65
[58] Field of Search ......................... 310/42, 43, 45, 71, 310/105, 106, 180, 194; 180/65 F; 192/84 B, 84 C, 84 T; 336/65; 188/266, 267, 270

[56] References Cited

U.S. PATENT DOCUMENTS

| | | | |
|---|---|---|---|
| 2,914,276 | 11/1959 | Antalek et al. | 336/65 X |
| 3,130,381 | 4/1964 | Oeler | 336/65 X |
| 3,649,939 | 3/1972 | Hildebrandt | 336/65 |
| 3,720,914 | 3/1973 | Hallerback | 310/43 |
| 3,873,861 | 3/1975 | Halm | 310/43 |

FOREIGN PATENT DOCUMENTS

| | | |
|---|---|---|
| 2032987 | 4/1971 | Fed. Rep. of Germany. |
| 2400379 | 6/1974 | Fed. Rep. of Germany. |
| 1454515 | 10/1966 | France. |
| 2293100 | 6/1976 | France. |
| 2295613 | 6/1976 | France. |

Primary Examiner—Mark O. Budd
Attorney, Agent, or Firm—Stevens, Davis, Miller & Mosher

[57] ABSTRACT

The invention concerns an eddy-current retarder whose stator comprises a ring of electro-magnets mounted on a transverse common support 4, each electro-magnet comprising a core surrounded by a coil of wire 2. Each coil 2 is entirely enveloped in a case of hard insulating material moulded thereon and this case is wedged angularly on support 4 by cooperation of bosses 7 moulded therewith and notches 6 or other depressions hollowed out in support 4.

10 Claims, 5 Drawing Figures

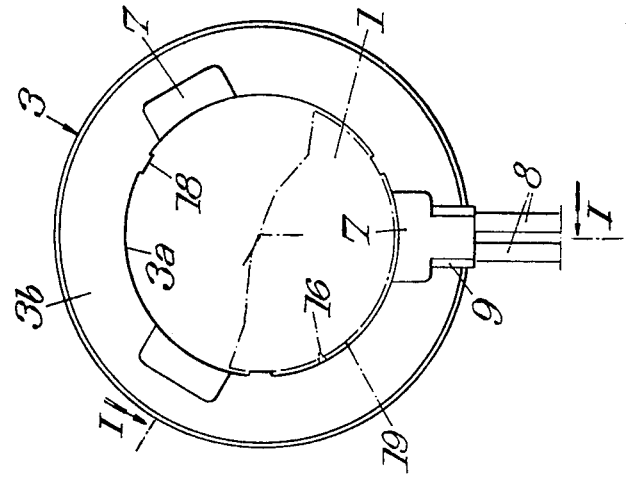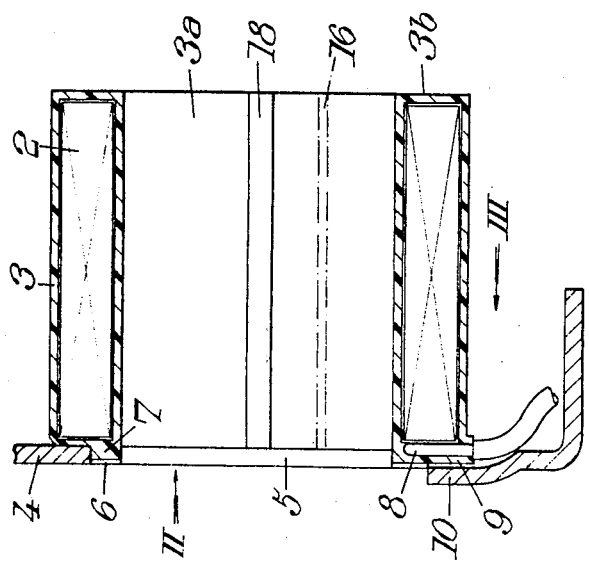

EDDY-CURRENT RETARDERS WHOSE STATOR COMPRISES A RING OF ELECTRO-MAGNETS

The present invention relates to eddy-current retarders for vehicles, comprising a stator and a rotor, the stator itself comprising a transverse support, in relation to the axis of the retarder, through which passes a portion of the vehicle shaft to be slowed down and at least a ring of electro-magnets spread out around said axis, carried by this support, each electro-magnet comprising a core axially mounted on the support, a coil of insulated conducting wire surrounding this core, and a pole piece having a cross-section greater than that of the core, inserted on the axial end of this core, opposite the support, and the rotor comprising a disk armature made of a ferro-magnetic material capable of being interlocked with the above shaft portion and mounted so as to rotate facing each ring of polar pieces.

In known embodiments, each coil is axially flanked by two insulating washers and outwardly of which, and sometimes inwardly, runs a rigid insulating sheath, the connection between the coil, the washers, the sheaths, the support, the core and the polar piece being provided by an adhesive means.

Despite the quality of the adhesives used, it happens that, in the long run, and because of the very severe operating conditions of the retarders considered (in particular shaking and over-heating, the temperatures reached frequently exceeding 500° C.), some at least of the assembled elements become unstuck from each other, which may cause angular displacement of the coils in relation to the sheaths and/or to the corresponding cores and, consequently, by wear of the insulating coating of the conducting wire leading to short-circuits or even breakage of the outer connection wires.

Moreover, the sealing provided by the assemblies of adhered elements is often precarious, in particular, when the vehicle such as for example a coach or a bus, fitted with a retarder of the above kind, is washed with a water jet containing certain cleaning products, the products may attack the insulation of the coils.

The invention has as its aim, especially, to remedy these different disadvantages.

It is essentially characterised in that each coil is entirely covered in a one piece case of a hard insulating material directly moulded thereon before it is mounted on the support, said case being wedged angularly on said support by the cooperation of at least one excentric wedging element (projection or recess), moulded therewith, with at least one complementary wedging element provided excentrically on the support.

In the preferred embodiment, recourse is had to one or the other of the following arrangements:

in a retarder in which the support comprises apertures, through which the cores pass axially, the recesses are notches cut out in the edges of said apertures and the projections are bosses provided on the corresponding front annular faces of the cases, in a retarder in which the support comprises ribs overlapping each electromagnet, the projections are formed by portions of these ribs and the recesses are formed by concave areas designed so as to joiningly cover said portions and hollowed out preferably laterally in the axial bosses moulded along with the cases, the case of each coil has an inner cylindrical surface of revolution from which project at least three longitudinal spacing ribs contacting the core, the spaces reserved angularly between the ribs and radially between the core and the case being filled with adhesive, the case is wedged angularly on the polar piece and/or on the core by cooperation of at least a bearing surface provided excentrically on one of the two elements to be mutually wedged (case on the one hand, polar piece or core on the other) with at least a complementary bearing surface provided on the other element, in a retarder according to the proceding paragraph, the bearing surfaces are, on the one hand, the sharp edges of strips inserted into the internal face of the case, these edges projecting radially from this face and being formed from a harder material than the cores, and, on the other hand, longitudinal grooves hollowed out by said edges in the cylindrical lateral surface of the corresponding core, such bearing surfaces ensuring moreover an axial wedging of the coil on the core.

The invention comprises, apart from these principal arrangements, certain other arrangements which are used preferably at the same time and which will be more explicitly discussed hereafter.

In what follows, there will be described preferred embodiments of the invention with reference to the accompanying drawings, in a manner which is of course in no way limiting.

FIG. 1 of these drawings shows an axial section along lines I—I of FIG. 2 and FIG. 3, an eddy-current retarder coil and a part of its support constructed in accordance with the invention.

FIG. 2 is an end view of the same coil separated from its support in the direction of arrow II of FIG. 1.

FIG. 3 is a view of the above support part without coil, in the direction of arrow III of FIG. 1.

Figure 4:
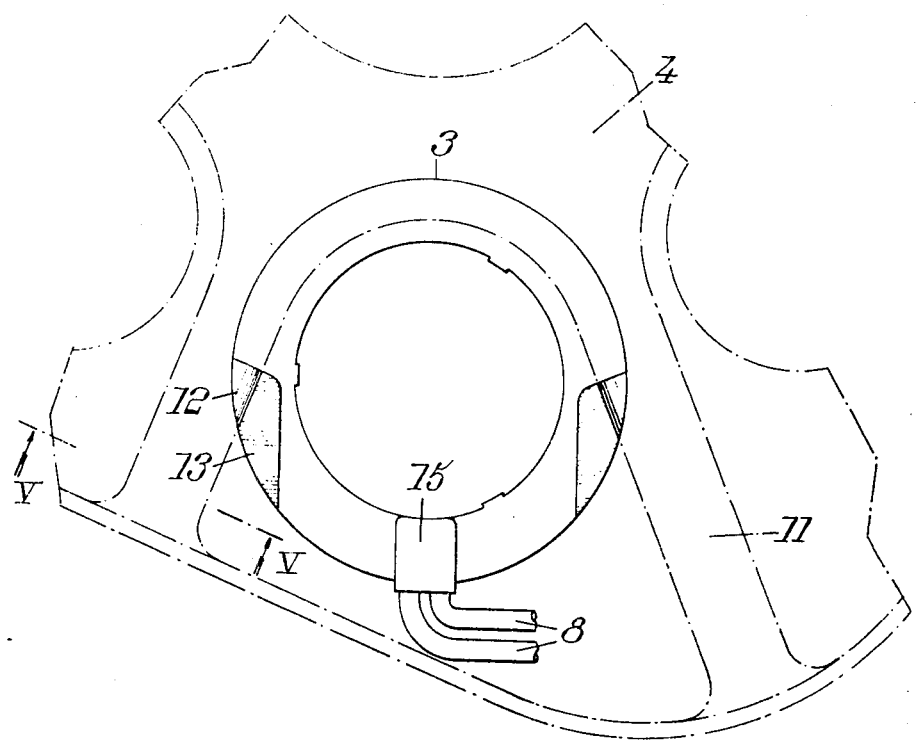
FIG. 4 shows a modification of the coil of the invention, seen in the direction of arrow IV of FIG. 5.
Figure 5:
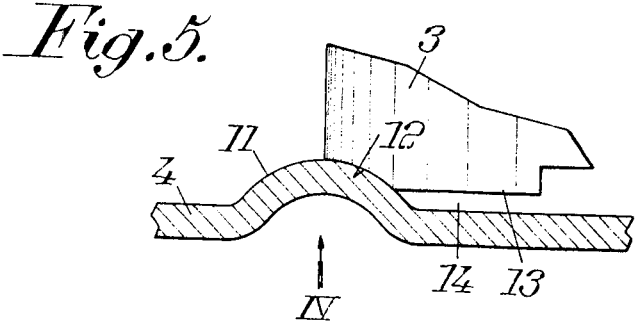

And FIG. 5 is a partial section of the coil-support assembly of FIG. 4 along line V—V of this FIG. 4.

We shall now consider an eddy-current retarder or speed reducer for vehicles, comprising a stator and a rotor.

In a way known per se the stator comprises a transverse support, i.e. extending essentially according to a plane perpendicular to the axis of the speed reducer, said support carrying at least one ring of electro-magnets, generally 6 or 8 in number, spread out around said axis, and the rotor comprises an armature disk made of a ferromagnetic material capable of being interlocked with the vehicle shaft to be slowed down and mounted on the stator so as to rotate facing each ring of electromagnets thereof.

Each electro-magnet comprises, in a way also known per se, an axial core 1 of soft metal or similar material, a cylindrical coil 2 of insulated conducting wire, generally enamelled, and a flat polar piece (not shown) inserted, generally by screwing, into an axial end of the core, the transverse surface of this part, generally trapezoidal, being a little greater than that of the core.

It is this coil 2 which is totally covered, according to the invention, with an on-moulded case 3, i.e. moulded on said coil, made of a thermosetting insulating plastic material compatible with the adhesives used and the insulating film of the coil wires, there being provided on the case excentric bearing surfaces or reliefs (in relation to the axis of the coil considered) capable of co-acting with complementary bearing surfaces or reliefs provided on the support and possibly on the polar piece-core assembly for purposes of mutual angular locking.

This combined double effect of covering and angular locking eliminates the different disadvantages mentioned above;

there no longer exists any risks of angular displacement between the coil and the support, and so of stripping the insulation and breaking the wires, the sealing of the windings is excellent and, in particular, withstands perfectly washings and outside agressions.

In the first embodiment shown in FIGS. 1 to 3, the transverse support is a metal dish 4 perforated by a ring of circular apertures 5 spread out around the axis of the speed reducer (axis not shown in FIG. 1 but located in the upper part thereof).

The angular locking elements of case 3 in relation to dish 4 comprise here:

three notches 6 of generally rectangular shape radially cut out in the edges of apertures 5, and three bosses 7, obtained by moulding, of generally parallelipipedic shape with rounded corners projecting from a front annular face of the case and capable of snugly fitting into notches 6.

One of bosses 7 contains the lead-out connections 8 of coil 2 and is extended radially by an appendix 9 taking over from said boss so as to guide said lead-outs as far as the outside of the coil.

This appendix 9 is itself housed in a socket 10 stamped in dish 4, this socket extending radially opposite the corresponding notch 6.

In this embodiment, as is well known, the mounting of each electro-magnet on the dish is provided by screwing the central core 1 of this electro-magnet against a cap wider than aperture 5, this cap being located on the side of the dish opposite that where the coil is located, said cap being able to form for the electromagnet a second polar shoe which, for greater firmness, may be spot-welded to the dish.

In a second embodiment shown in FIGS. 4 and 5, the support is again formed by a dish but the bottom of this dish instead of being flat, as previously, is stamped so as to present a succession of rectilinear ribs 11 preferably with a rounded profile extending radially star-wise from a central part raised by stamping up to the level of the ribs, each circular aperture 5 being traversed by a core (not shown) which is thus overlapped by two such ribs extending along the two arms of a V connected by a rounded part to said central part, with convexity turned towards the axis of the speed reducer: such a support has been described in particular in French Pat. No. 74 39096 filed on 28th Nov. 1974 by the present applicant.

In this case, it is the ribs 11 which form the projections of the support adapted to angularly lock the coils; the cases 3 of these coils comprise, for this purpose, each one two concave areas 12 designed so as to be applied in a joining manner each one against a rib part 11.

Each area 12 forms advantageously the outer side of a boss 13 provided on the corresponding end or front face of case 3.

The axial height of this boss 13 is preferably less than that of ribs 11, so that there remains a gap 14 between each coil and the bottom of dish 4 opposite: thus the axial application of each case against the support 4 is ensured along areas 12 of this case, the desired angular locking being thus properly obtained.

Again there can be seen in FIG. 4 an extra boss provided, as previously appendix 9, to receive and guide the lead-outs of the wires 8 of the coil.

According to these advantageous variations which may be used separately or simultaneously in combination with one at least of the preceding arrangements, the angular locking of case 3 is moreover ensured in relation to the core-polar piece assembly by one and/or the other of the following arrangements:

rectilinear strips may be inserted longitudinally into the internal cylindrical face 3a of case 3 so as to present each one, outwardly of this face, a sharp edge 16 of a harder material than that forming cores 1, each of these edges cooperating with a corresponding groove hollowed out thereby in the cylindrical lateral surface of the corresponding core 1 at the time of mounting the coil on this core; the sharp edges 16 are advantageously substantially rectilinear and slightly slanted towards the axis and the free end of the core, in the preferred case where the front face 3b of case 3 in contact with the polar piece protudes transversely beyond this piece in at least one area, there can be used, to provide the desired angular locking of said case in relation to said piece, on the one hand, a portion at least of the edge of this piece and, on the other hand, the side of at least one boss provided in the protruding zone of face 3b, this side being disposed so as to come jointingly into contact with said edge portion.

In the figures, there can be seen longitudinal ribs 18 projecting radially inwardly on the internal cylindrical face 3a of case 3; these ribs 18, moulded with the case, provide for a slight spacing of said surface 3a from core 1 which surrounds it, narrow spaces 19 being thus provided angularly between these ribs and radially between the core and the case and which may be filled with adhesive to complete the connection between the case and the core.

Whereby, and whatever the embodiment adopted, there is provided finally a speed reducer whose coils are perfectly sealed and are angularly locked very firmly on their supports as well as on the cores and polar pieces which are associated therewith.

As is evident, and as it results moreover from what has gone before, the invention is in no wise limited to those of its modes of application and embodiments which have been more specially considered; it covers, on the contrary, all variations thereof.

I claim:

1. An eddy-current retarder or speed reducer for vehicles, comprising a stator and a rotor, the stator itself comprising a support mounted transversely with respect to the axis of the speed reducer, through which passes centrally a portion of the vehicle shaft to be slowed down and at least one ring of electro-magnets spread out around said axis and carried by said support, each electro-magnet comprising a core mounted axially on said support, a coil of insulated conducting wire surrounding said core, and a polar piece with a cross-section greater than that of said core, inserted in the axial end of this core opposite the support, and the rotor comprising an armature disk made of a ferro-magnetic material adapted to be interlocked with said shaft portion and mounted so as to rotate facing each ring of polar pieces, each said coil being housed in a case of a hard insulating material of thermosetting plastic presenting at least one first excentric angular wedging element capable of co-acting with at least one second complementary wedging element provided excentrically on the support, said first and second wedging elements being formed respectively by a projection provided on one of said case and said support and by a recess provided correspondingly on the other of said case and said support, each coil case being directly moulded as a single block on the coil before it is mounted on the support whereby each said coil is entirely and intimately embedded in said block, and the wedging element presented by said case being moulded integrally therewith.

2. A speed reducer according to claim 1, in which the support is provided with apertures through which the cores pass axially, wherein the recesses are notches cut out in the edges of said apertures and the projections are bosses provided on the corresponding front annular faces of the cases.

3. A speed reducer according to claim 1, in which the support comprises two ribs provided on the sides of each electro-magnet, wherein the projections are formed by portions of these ribs and the recesses are formed by concave areas designed so as to jointingly cover said rib portions and hollowed out preferably laterally in the axial bosses integrally moulded with the cases.

4. A speed reducer according to claim 1 wherein the lead-out connections of each coil are buried in a boss moulded integrally with its case to project axially on the front annular face of this case which is applied against the support.

5. A speed reducer according to claim 4, wherein hollow areas are provided in the support to receive at least in part the bosses in which are buried the lead-out connections of the coils.

6. A speed reducer according to claim 5, in which the support is formed by a cut-out metal sheet, wherein the hollow areas are formed by portions of said metal sheet deformed by stamping.

7. A speed reducer according to claim 1 in which the case of each coil has an inner cylindrical surface of revolution from which project at least three longitudinal spacing ribs coming into contact with the core, wherein the spaces formed angularly between ribs and radially between the core and the case are filled with adhesive.

8. A speed reducer according to claim 1 wherein each case is wedged angularly on the polar piece and/or on an associated core by cooperation of at least one bearing surface provided excentrically on one of the two elements to be mutually wedged together with at least one complementary bearing surface provided on the other element.

9. A speed reducer according to claim 8, wherein said bearing surfaces are, on the one hand, edges of polar pieces not protruding transversely from the corresponding cases and, on the other hand, the inner faces of bosses provided on the corresponding front annular faces of the cases.

10. A speed reducer according to claim 8, wherein the bearing surfaces are, on the one hand, sharp edges of strips projecting radially inward from the inner face of the case, said edges being formed of a harder material than the cores and, on the other hand, longitudinal grooves hollowed out by said edges in the cylindrical lateral surface of the corresponding core.

* * * * *